US012691886B2

(12) United States Patent
Mochizuki

(10) Patent No.: US 12,691,886 B2
(45) Date of Patent: Jul. 28, 2026

(54) INFORMATION COLLECTION CONTROL DEVICE AND METHOD FOR VEHICLE

(71) Applicant: DENSO CORPORATION, Kariya-city (JP)

(72) Inventor: Shunsuke Mochizuki, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 215 days.

(21) Appl. No.: 18/446,207

(22) Filed: Aug. 8, 2023

(65) Prior Publication Data

US 2023/0382389 A1 Nov. 30, 2023

Related U.S. Application Data

(63) Continuation of application No. PCT/JP2022/004894, filed on Feb. 8, 2022.

(30) Foreign Application Priority Data

Feb. 10, 2021 (JP) ................................. 2021-020076

(51) Int. Cl.
 *B60W 40/02* (2006.01)
 *B60W 60/00* (2020.01)
(52) U.S. Cl.
 CPC .......... *B60W 40/02* (2013.01); *B60W 60/001* (2020.02); *B60W 2554/404* (2020.02)
(58) Field of Classification Search
 CPC ............... B60W 40/02; B60W 60/001; B60W 2554/404
 USPC ........................................................ 701/23
 See application file for complete search history.

(56) References Cited

U.S. PATENT DOCUMENTS

| | | | |
|---|---|---|---|
| 2016/0307047 A1 * | 10/2016 | Krishnamoorthy | ......................... H04N 23/6811 |
| 2018/0154825 A1 | 6/2018 | Tanaka | |
| 2019/0317513 A1 | 10/2019 | Zhang et al. | |
| 2020/0055447 A1 | 2/2020 | Tanaka | |

(Continued)

FOREIGN PATENT DOCUMENTS

| | | | | |
|---|---|---|---|---|
| CN | 104364824 A | * | 2/2015 | ............. G06T 7/254 |

OTHER PUBLICATIONS

Bryan Russell, LabelMe: A Database and Web-based Tool for Image Annotation, Oct. 31, 2007, International Journal Of Computer Vision, Springer (Year: 2007).*

*Primary Examiner* — Matthias S Weisfeld
(74) *Attorney, Agent, or Firm* — Precision Patents, P.C.

(57) ABSTRACT

In an information collection control device for a vehicle capable of autonomous driving; and configured to collect information about objects when the vehicle, during autonomous driving, receives driving assistance from a driving assistance control device, an identification unit analyses detection information detected by a sensor that monitors surroundings of the vehicle to identify a plurality of types of objects. An acquisition unit acquires, for each object identified, a location and an occupied area of the object. A time-interval setting unit sets a time interval for the acquisition unit acquiring the location and the occupied area. A score calculation unit calculates a size of an area of overlap between the occupied areas of the same object acquired before and after the set time interval. A priority determination unit determines a priority for transmission to the driving assistance control device based on the calculated size of the area of overlap.

10 Claims, 7 Drawing Sheets

(56)     References Cited

U.S. PATENT DOCUMENTS

2020/0265248 A1*   8/2020   Kwon ................ G01C 21/3804
2020/0298891 A1*   9/2020   Liang .................... G06V 20/58
2020/0341486 A1*  10/2020   Dia ...................... G05D 1/0238
2021/0208597 A1     7/2021   Zhang et al.
2021/0271249 A1*   9/2021   Kobashi ................ G06V 20/58
2021/0347378 A1*  11/2021   Nabatchian ..... B60W 60/00276

* cited by examiner

TO OBTAIN CONDITIONS ON ROAD → DECREASE TIME INTERVAL (TO 0.1 SECONDS, FOR EXAMPLE)

24

0.1 SECONDS

TO MAINLY COLLECT OBSTACLE INFORMATION → INCREASE TIME INTERVAL (TO 1.0 SECOND, FOR EXAMPLE)

24

1.0 SECOND

EXAMPLE IMAGE CAPTURED BY ONBOARD CAMERA

26

TYPES OF OBJECTS

···PERSON

···VEHICLE

···STREETCAR

···CONSTRUCTION SITE

TIME INTERVAL = 0.1 SECONDS

24A

PARKED VEHICLE    LOCATIONS OF VEHICLE ARE THE SAME

24B

TRAVELING VEHICLE    LOCATIONS OF VEHICLE ARE DIFFERENT
(PARTIAL OVERLAP DUE TO
SMALL AMOUNT OF MOVEMENT)

24C

PERSON CROSSING ROAD    PERSON IS HARDLY MOVING

LEGEND

OR  ...LOCATION DETECTED EARLIER

OR  ...LOCATION DETECTED LATER

OR  ...OVERLAPPING AREA (SCORE)

INFORMATION COLLECTION CONTROL DEVICE AND METHOD FOR VEHICLE

CROSS-REFERENCE TO RELATED APPLICATION

This application is a continuation application of International Application No. PCT/JP2022/004894 filed Feb. 8, 2022 which designated the U.S. and claims priority to Japanese Patent Application No. 2021-020076 filed with the Japan Patent Office on Feb. 10, 2021, the contents of each of which are incorporated herein by reference.

BACKGROUND

Technical Field

The present disclosure relates to an information collection control device and an information collection control method for collecting information necessary to provide autonomous driving assistance for an autonomous driving vehicle.

Related Art

In recent years, development of autonomous driving of vehicles, such as automobiles, has been underway. In particular, development of autonomous driving vehicles is very active, in each of which an on-board system automatically performs all of acceleration, steering, and braking of the vehicle, and a driver manually drives the vehicle only when requested by the system.

Concurrently with such development of autonomous driving vehicles, driving assistance technologies are also being developed to remotely ensure safe driving of the vehicles in the event that a situation arises that interferes with autonomous driving during autonomous driving.

DESCRIPTION OF SPECIFIC EMBODIMENTS

Figure 1:
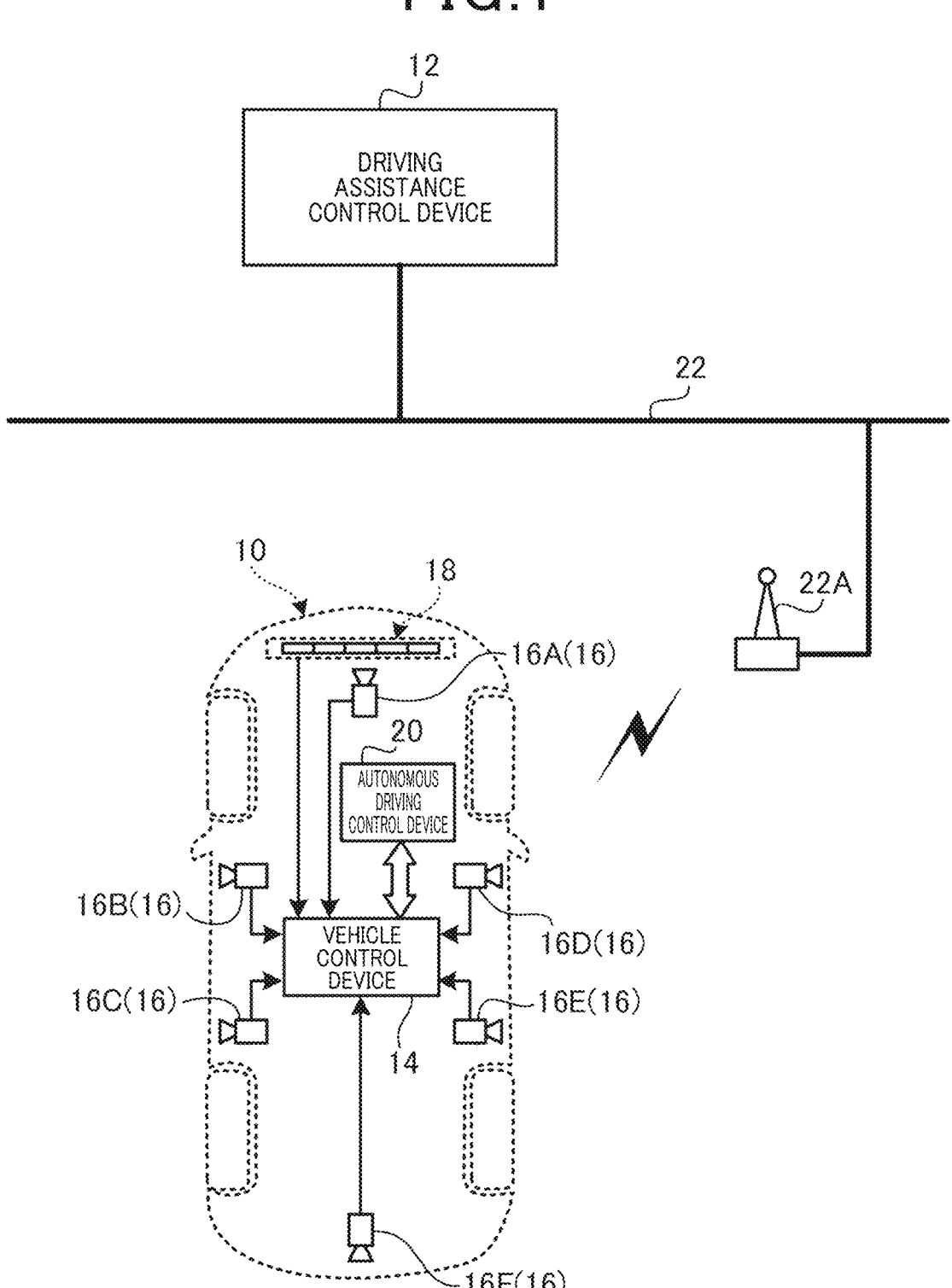
FIG. 1 is a schematic diagram of a driving assistance system including a driving assistance control device that assists driving in autonomous driving of a vehicle according to one embodiment.

JP 2019-182404 A discloses a sensor aggregation framework for autonomous driving vehicles.

More specifically, in the technology disclosed in JP 2019-182404 A, sensor data is collected from one or more sensors mounted to an autonomous driving vehicle (ADV) when the ADV moves within a region of interest (ROI) that includes a plurality of obstacles. The sensor data includes obstacle information about the obstacles and vehicle data about the ADV. A plurality of timestamps corresponding to the vehicle data are generated by time-stamping each piece of the vehicle data using the current time at which the piece of vehicle data is captured. The obstacle information, vehicle data, and corresponding time stamps are aggregated into training data. The training data is used to train a set of parameters that are used later to at least partially predict future obstacle behaviors and vehicle motion of the ADV.

For reference, JP 2019-215893 A discloses a system that includes a data acquisition unit to acquire a plurality of types of external environment information data around an own vehicle, and a data selection unit to select a portion of the external environment information data and outputs it to the external. The data selection unit determines from the external environment information data whether the vehicle can move into adjacent lanes, uses the result of determination to recognize a travelable region in which the own vehicle can move, and deletes portions of information about regions outside the travelable region.

However, as a result of detailed research performed by the present inventors, the following issue has been found with the conventional technology described above. That is, although there is a technology to partially delete information about regions outside the travelable region, an enormous amount of data needs to be output externally (e.g., to the cloud managed by the operation center that provides driving assistance) even with this technology, and information transmission abnormalities may occur depending on the communication quality.

However, the information to be transmitted may include information that is less important as driving assistance for autonomous driving.

For example, in a case where a vehicle traveling at a certain speed or higher is detected, but the vehicle has left the vicinity, the information is of low importance in the driving assistance phase.

A person moving along the side of a road, walking in the direction opposite from the traffic direction of a road, is unlikely to affect an autonomous driving vehicle and is therefore less important information.

In view of the above, it is desired to have an information collection control device and an information collection control method for setting a priority of information for driving assistance and quantifying a degree of importance of the information, thereby collecting the information for driving assistance.

One aspect of the present disclosure provides an information collection control device for a vehicle capable of autonomous driving, configured to collect information about objects for recognition located in a vicinity of the vehicle when the vehicle, during autonomous driving, receives driving assistance from a driving assistance control device, the information collection control device including: an identification unit configured to analyse detection information detected by a sensor that monitors surroundings of the vehicle to identify a plurality of types of objects for recognition located in the vicinity of the vehicle; an acquisition unit configured to acquire, for each object for recognition identified by the identification unit, a location and an occupied area of the object for recognition on a map corresponding to the vicinity of the vehicle; a time-interval setting unit configured to set a time interval for the acquisition unit acquiring the location and the occupied area of the object for recognition; a score calculation unit configured to calculate a size of an area of overlap between the occupied areas of the object for recognition acquired before and after the time interval set by the time-interval setting unit; and a priority determination unit configured to determine a priority for transmission to the driving assistance control device based on the size of the area of overlap of the object for recognition calculated by the score calculation unit.

Another aspect of the present disclosure provides an information collection control method for collecting information about objects for recognition located in a vicinity of a vehicle capable of autonomous driving, when the vehicle, during autonomous driving, receives driving assistance from a driving assistance control device, the information collection control method including: analysing detection information detected by a sensor that monitors surroundings of the vehicle to identify a plurality of types of objects for recognition located in the vicinity of the vehicle; acquiring, for each identified object for recognition, a location and an occupied area of the object for recognition on a map corresponding to the vicinity of the vehicle; setting a time interval for acquiring the location and the occupied area of the object for recognition; calculating a size of an area of overlap between the occupied areas of the object for recognition acquired before and after the set time interval; and determining a priority for transmission to the driving assistance control device based on the calculated size of the area of overlap of the object for recognition.

Still another aspect of the present disclosure provides a non-transitory computer readable medium having stored thereon instructions executable by a computer to cause the computer to perform an information collection control method for collecting information about objects for recognition located in a vicinity of a vehicle capable of autonomous driving, when the vehicle, during autonomous driving, receives driving assistance from a driving assistance control device, the information collection control method including: analysing detection information detected by a sensor that monitors surroundings of the vehicle to identify a plurality of types of objects for recognition located in the vicinity of the vehicle; acquiring, for each identified object for recognition, a location and an occupied area of the object for recognition on a map corresponding to the vicinity of the vehicle; setting a time interval for acquiring the location and the occupied area of the object for recognition; calculating a size of an area of overlap between the occupied areas of the object for recognition acquired before and after the set time interval; and determining a priority for transmission to the driving assistance control device based on the calculated size of the area of overlap of the object for recognition.

According to this disclosure, when information for driving assistance is collected, a priority of the information can be set by quantifying a degree of importance of the information.

FIG. 1 is a schematic diagram of a driving assistance system including a driving assistance control device 12 that assists driving in autonomous driving of a vehicle 10 in the present embodiment.

A vehicle control device 14 and an autonomous driving control device 20 are mounted to the vehicle 10. The autonomous driving control device 20 is primarily responsible for autonomous driving control and also functions as an information collection control device of the present disclosure. The autonomous driving control device 20 is configured, for example, as including a central processing unit (CPU) and a rewritable non-volatile memory. The non-volatile memory stores a program indicating the driving assistance request control routine described later, and the CPU reads and performs the program.

The vehicle control device 14 performs control, including driving systems (e.g., engine control) and electrical systems (e.g., fault diagnosis using state detection sensors for each part) when the vehicle 10 is traveling.

A group of cameras (FIG. 1 illustrates, as an example, a front camera 16A, a left front camera 16B, a left rear camera 16C, a right front camera 16D, a right rear camera 16E, and a rear camera 16F) that capture images of surroundings of the vehicle (collectively, "group of cameras 16") are connected to the vehicle control device 14. A group of radars 18 including a plurality of millimeter-wave radars and LIDAR is connected to the vehicle control device 14.

The autonomous driving control device 20 determines the driving operations to reach the destination based on information necessary for autonomous driving from the vehicle control device 14 (e.g., detection information from the group of cameras 16 and the group of radars 18 described above) and instructs the vehicle control device 14 to perform the driving operations.

The autonomous driving control device 20 is communicable with the driving assistance control device 12 via the wireless communication device 22A of the network 22.

In the driving assistance control device 12, autonomous driving history information from each of the vehicles 10 is aggregated, and an operator OP (see FIG. 2) provides driving assistance instructions as needed. An infrastructure device management system (not shown) is connected to the network, and real-time road information, times and weather conditions at the times of information acquisition, etc. can be acquired from the infrastructure device management system as needed.

In a case where a situation (event) that interferes with autonomous driving occurs while the vehicle 10 is traveling under autonomous driving control, the vehicle may receive appropriate driving assistance from the operator OP monitoring the vehicle 10 on the driving assistance control device 12 side and continue traveling despite the situation that interferes with autonomous driving.

At this time, on the driving assistance control device 12 side, an operation is required to select and discard information according to the event from all the information.

To this end, in the present embodiment, the necessary information is obtained on a priority basis, allowing for prompt notification of appropriate advice in response to the aforementioned event.

As a means of preferentially acquiring necessary information, in the present embodiment, degrees of importance of objects 24 for recognition, such as neighbouring vehicles (see FIG. 4A, 4B), are quantified, and the priorities are determined by comparison of these quantified values.

For quantification, locations of an object 24 for recognition based on images captured before and after a predefined time interval are compared, and a numerical value (score) based on an overlapping area of the object 24 for recognition is calculated. In the present embodiment, the score is an area.

In the same situation (e.g., the same area of a high-precision map), the object 24 for recognition may be distinguished into any of the following objects 24 for recognition:

(1) an object 24 for recognition that is stationary;

(2) an object 24 for recognition moving at a relatively low speed; and (3) an object 24 for recognition moving at a relatively high speed.

To distinguish between low and high speeds, a predefined speed may be used as a threshold (e.g., 10 km/h or the like).

In the same situation, between the images captured before and after a predefined detection time interval, an area of overlap between occupied areas of the object 24 for recognition of the road surface on the high-precision map varies with the type of object 24 for recognition ((1) to (3)).

In the present embodiment, when a situation (event) occurs that interferes with autonomous driving, the time interval is indicated by the operator OP to the corresponding vehicle 10.

Figure 4A:
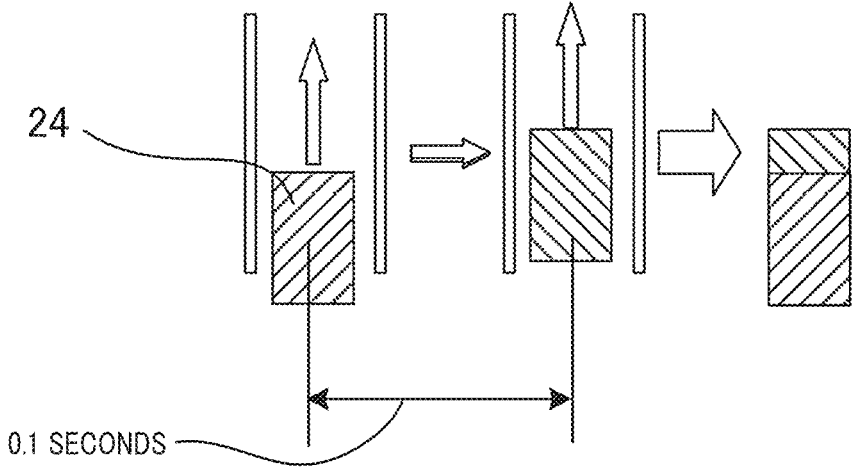
FIG. 4A is a plan view illustrating a situation where an overlap of areas of a road surface occupied by an object for recognition before and after a predefined time interval (score) is acquired in the case of the detection time interval (of 0.1 seconds) for seeing conditions on the road.
Figure 4B:
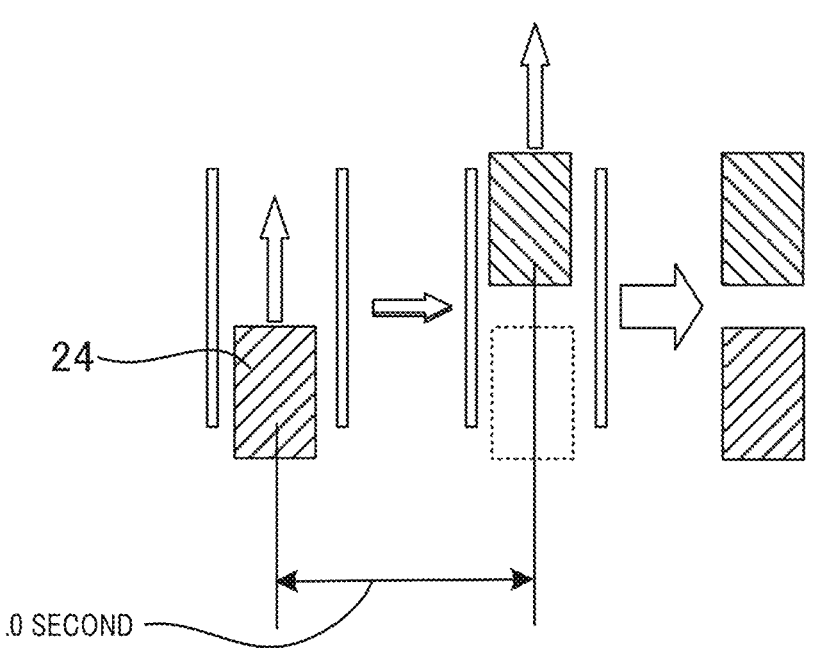
FIG. 4B is a plan view illustrating a situation where an overlap of areas of a road surface occupied by an object for recognition before and after a predefined time interval (score) is acquired in the case of the detection time interval (of 1.0 second) for collecting obstacle information mainly.

The indication by the operator OP from the driving assistance control device 12 side is a specific numerical value, for example, time interval=0.1 seconds (see FIG. 4A) or time interval=1.0 seconds (see FIG. 4B).

Figure 2:
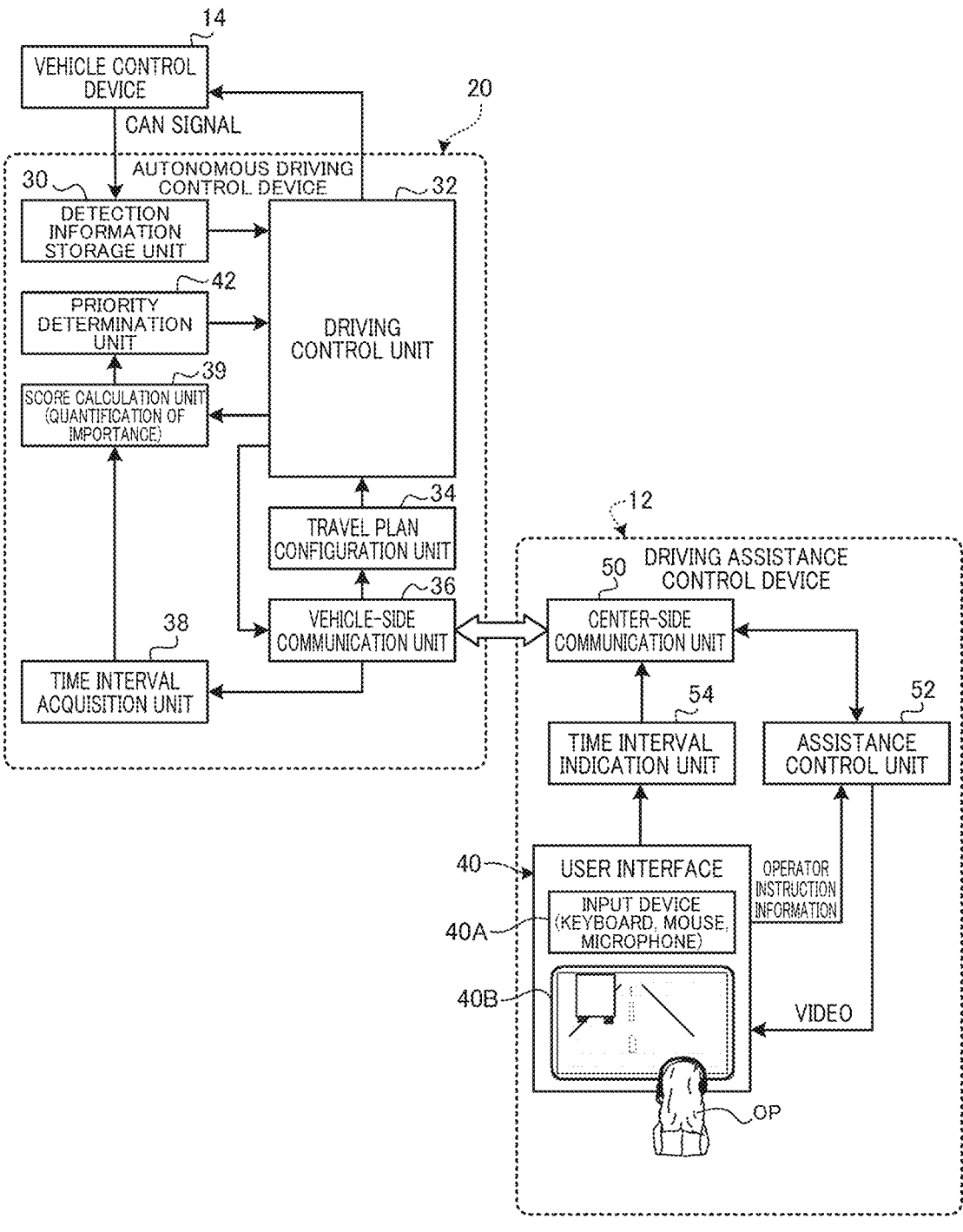
FIG. 2 is a functional block diagram illustrating transmission and reception control of information based on a request for assistance performed between an autonomous driving control device and the driving assistance control device according to one embodiment.

FIG. 2 is a functional block diagram for performing control of transmitting and receiving information based on a request for assistance performed between the autonomous driving control device 20 and the driving assistance control device 12. This functional block diagram is an example. The types and combinations of functions are not limited as long as they achieve the purpose of this disclosure. Some or all of the functions illustrated in FIG. 2 may be software processing implemented by a microcomputer or the like executing at least one program.

Autonomous Driving Control Device 20

The detection information storage unit 30 receives and stores detection information of the group of cameras 16 and the group of radars 18 and the diagnosis code (controller area network (CAN) signal) via the vehicle control device 14. The detection information storage unit 30 is connected to the driving control unit 32 (corresponding to an identification unit), and necessary detection information is transmitted to the driving control unit 32 as driving control information.

The driving control unit 32 is connected to the travel plan configuration unit 34.

The travel plan configuration unit 34 acquires driving assistance information from the driving assistance control device 12 via the vehicle-side communication unit 36 (corresponding to an acquisition unit), configures a travel plan, and notifies the driving control unit 32 of the travel plan.

Here, the driving control unit 32 may request the driving assistance control device 12 for driving assistance via the vehicle-side communication unit 36.

The travel plan configuration unit 34 receives a response to this request for driving assistance via the vehicle-side communication unit 36, adjusts (modifies, changes, or cancels) the travel plan, and notifies the driving control unit 32 of the adjusted travel plan.

In the present embodiment, when the driving control unit 32 requests the autonomous driving assistance control device 12 to provide driving assistance upon occurrence of a situation (event) that interferes with autonomous driving, a predefined time interval is acquired by the time interval acquisition unit 38 via the vehicle-side communication unit 36.

The time interval acquisition unit 38 is connected to a score calculation unit 39, and transmits information about the acquired time interval to the score calculation unit 39.

The score calculation unit 39 is connected to the driving control unit 32, and acquires information about the real-time high-precision map at acquired predefined time intervals.

The score calculation unit 39 analyses this high-precision map and calculates, for each of the objects 24 for recognition, an area of overlap between the occupied areas of the same object 24 for recognition acquired before and after the predefined time interval. This corresponds to the quantified degree of importance of each of the objects 24 for recognition.

The score calculation unit 39 is connected to the priority determination unit 42, and transmits a result of calculation (that is, the scores of the objects 24 for recognition) to the priority determination unit 42.

The priority determination unit 42 compares the scores of respective objects 24 for recognition and determines priorities of the respective objects 24 for recognition for transmission to the driving assistance control unit 12.

As an example, the scores are classified into zero (corresponding to cases where occupied areas of an object 24 for recognition before and after a predefined time interval do not overlap at all) and non-zero values (corresponding to cases where occupied areas of an object 24 for recognition before and after a predefined time interval overlap partially or completely), and the driving control unit 32 is notified to transmit information about the objects 24 for recognition with non-zero scores.

Based on the notification from the priority determination unit 42, the driving control unit 32 transmits information about the corresponding object 24 for recognition to the driving assistance control unit 12 via the vehicle-side communication unit 36.

Driving Assistance Control Device 12

As illustrated in FIG. 2, the driving assistance control device 12 includes a center-side communication unit 50.

The center-side communication unit 50 is paired with the vehicle-side communication unit 36 of the autonomous driving control device 20 to transmit and receive information.

The center-side communication unit 50 acquires information regarding autonomous driving information via the vehicle-side communication unit 36 and transmits this information to the assistance control unit 52.

The assistance control unit 52 transmits the acquired information (captured information from the group of cameras 16, detected information from the group of radars 18, and high-precision map information, etc.) to the user interface 40.

The user interface 40 is equipped with an input device (a keyboard, a mouse, a microphone, etc.) 40A and a monitor 40B as an output device.

In the user interface 40, based on the information received from the assistance control unit 52, real-time on-site images or the like are displayed on the monitor 40B, which are viewed by the operator OP.

Based on the images displayed on the monitor 40B, the operator OP determines what kind of assistance is to be provided and inputs assistance instruction information through the input device 40A.

The assistance control unit 52 receives the assistance instruction information received from the input device 40A and transmits it to the autonomous driving control device 20 via the center-side communication unit 50.

Indication of Detection Time Interval

When a situation (event) occurs on the vehicle side that interferes with autonomous driving and a request for driving assistance to the autonomous driving control device 12 is received, the operator OP has to quickly consider a response (driving assistance) and provide a notification.

The operator OP determines what information is needed on a top priority basis based on the situation (event) that interferes with autonomous driving, and based on the determination, inputs or enters information regarding the detection time interval using the input device 40A. The input information is transmitted to a time interval indication unit 54. The time interval indication unit 54 specifies a predefined time interval and transmits it to the autonomous driving control device 20 via the center-side communication unit 50.

The information input by the operator OP may be, for example, a specific numerical value such as time interval=0.1 seconds or time interval=1.0 second, or it may be voice or text information such as "I want to see the condition in the vicinity of the own vehicle on the road" or "I want to collect obstacle information mainly". In the latter case, incorporating a voice or character recognition function in the time interval indication unit 54 and accessing a database (not shown) that stores a table of time intervals associated with the voice or character information, allow outputs from the time interval indication unit 54 to be the optimum detection time interval information to meet the request of the operator OP.

The operations in the present embodiment will now be described according to the flowchart illustrated in FIG. 3.

Figure 3:
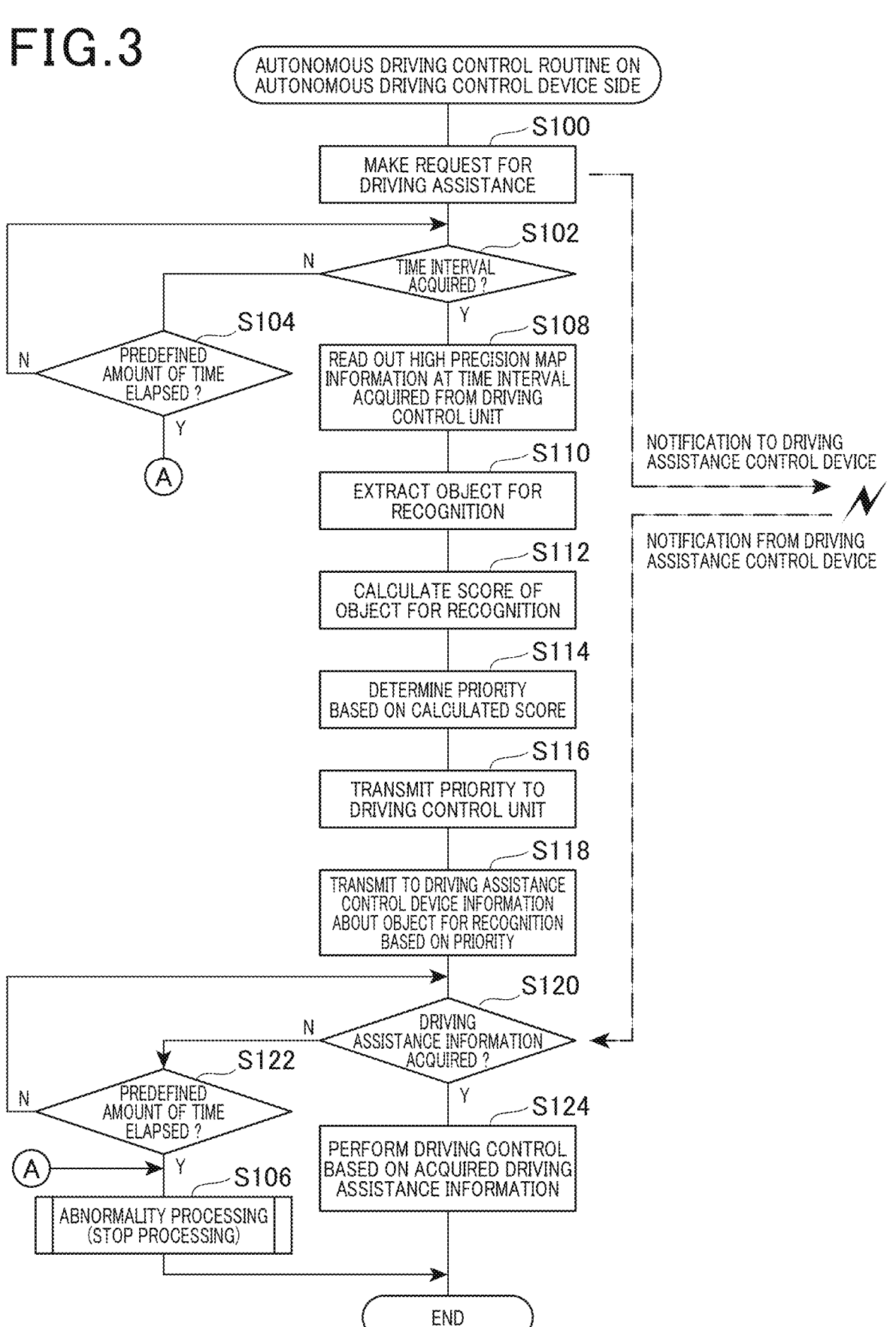
FIG. 3 is a flowchart of a driving assistance request control routine that is a subroutine of an autonomous driving control routine performed by the autonomous driving control device according to one embodiment.

FIG. 3 is a flowchart of a driving assistance request control routine, which is a subroutine of an autonomous driving control routine performed on the autonomous driving control device 20 side.

At step 100, a request for driving assistance is made to the driving assistance control device 12. This request for driving assistance is transmitted to the center-side communication unit 50 of the driving assistance control device 12 via the vehicle-side communication unit 36.

Upon the operator OP, who visually manages the monitor 40B of the user interface 40 of the driving assistance control device 12, recognizing the request for driving assistance, the operator OP grasps the situation (event) that interferes with autonomous driving on which the driving assistance is based, and based on the information necessary for the driving assistance, inputs the time interval using the input device 40A.

This time interval input by the operator OP is transmitted to the vehicle-side communication unit 36 of the autonomous driving control device 20 via the center-side communication unit 50.

At next step 102, it is determined whether a time interval has been acquired from the driving assistance control device 12.

If the answer is NO at step 102, the routine proceeds to step 104. At step 104, it is determined whether a predefined amount of time has elapsed. If the answer is NO at step 104, the routine returns to step 102, and if the answer is YES at step 104, the routine proceeds to step 106.

At step 106, it is determined that there is no response to the request for driving assistance, abnormality processing (e.g., stop processing, etc.) is performed, and this routine ends.

If the answer is YES at step 102, it is determined that there has been a response (indication of the time interval) to the request for driving assistance, and the routine proceeds to step 108.

At step 108, the high precision map information is read out at the time interval acquired from the driving control unit 32, and then the routine proceeds to step 110, where the object 24 for recognition is extracted.

At next step 112, the score of the extracted object 24 for recognition is calculated.

Example of Score Calculation

FIG. 4A illustrates a changing state of the object 24 for recognition (another vehicle) in the case of the indicated detection time interval of 0.1 seconds, where two occupied road surface areas (specifically, an area of overlap between these areas of the same object 24 for recognition) on the high-precision map before and after a time interval of 0.1 seconds are calculated. This is a suitable detection time interval when one wishes to see conditions in the vicinity of the vehicle 10 on the road. In the example illustrated in FIG. 4A where the object 24 for recognition is traveling or moving at a typical speed (about 20 to 40 km/h), it can be seen that the occupied road surface areas of the object 24 for recognition before and after a time interval of 0.1 seconds partially overlap.

FIG. 4B illustrates a changing state of the object 24 for recognition (another vehicle) in the case of the indicated detection time interval of 1.0 second, where two occupied road surface areas (specifically, an area of overlap between these areas of the same object 24 for recognition) on the high-precision map before and after a time interval of 1.0 second are calculated. This is a suitable detection time interval when one wishes to refer to obstacles around the vehicle 10.

In the example illustrated in FIG. 4B where the object 24 for recognition is traveling or moving at a typical speed (about 20 to 40 km/h), it can be seen that the occupied road surface areas of the object 24 for recognition before and after a time interval of 1.0 second little overlap.

As illustrated in FIG. 3, upon completion of calculation of the score at step 112, the routine proceeds to step 114. At step 114, the priority is determined based on the calculated score, and then the routine proceeds to step 116.

At step 116, the priority is transmitted to the driving control unit 32, and then the routine proceeds to step 118.

At step 118, information about the object 24 for recognition is transmitted to the driving assistance control device 12 based on the priority. The frequency of transmitting the information to the driving assistance control device 12 may depend on a degree of importance of the information. That is, the frequency of transmitting information with a high priority may be higher than the frequency of transmitting information with a low priority. In addition, an urgency flag for the information may be set additionally. When the urgency flag is set, the frequency of transmission may be increased.

Upon the operator OP, who visually manages the monitor 40B of the user interface 40 of the driving assistance control device 12, recognizing information about the recognized object 24 for recognition, the operator OP inputs avoidance information using the input device 40A to avoid a situation (event) that interferes with autonomous driving on which the driving assistance is based.

This input avoidance information is, for example, converted into driving assistance information that can be interpreted by the autonomous driving control device 20, in the assistance control unit 52, and transmitted to the vehicle-side communication unit 36 of the autonomous driving control device 20 via the center-side communication unit 50.

At next step 120, it is determined whether driving assistance information has been acquired from the driving assistance control device 12.

If the answer is NO at step 120, the routine proceeds to step 122 to determine whether a predefined amount of time has elapsed. If the answer is NO at step 122, the routine returns to step 120, and if the answer is YES, the routine proceeds to step 106.

At step 106, it is determined that there is no response to the request for driving assistance, the abnormality processing (e.g., stop processing or the like) is performed, and this routine ends.

If the answer is YES at step 120, the routine proceeds to step 124, where driving control is performed based on the acquired driving assistance information, and this routine ends.

According to the present embodiment, the driving assistance control device 12 indicates to the vehicle 10 a time interval that depends on movement of an object 24 for recognition, such as a neighbouring vehicle or the like, which allows the vehicle to acquire the necessary and sufficient data for information. This leads to a reduction in the workload of acquiring information by the operator OP. In other words, on the monitor 40B (see FIG. 2) monitored by the operator OP, images necessary for driving assistance will be indicated with the workload of the operator OP discarding and selecting information reduced.

Image Processing for Setting Priority

Figure 5:
FIG. 5 is an example of an image captured by a group of cameras mounted to a vehicle.
Figure 5:
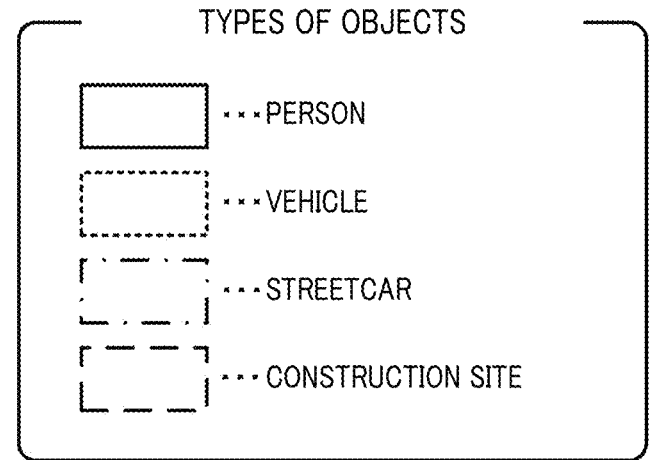

FIG. 5 is an image 26 captured by the group of cameras 16 mounted to the vehicle 10. The driving control unit 32 of the autonomous driving control device 20 analyses the image 26, tracks objects 24 for recognition (represented here by solid lines for people, dashed-dotted lines for vehicles, dashed-dotted lines for streetcars, and chain-lines for construction sites), and applies them to a high-precision map (planar map) for autonomous driving.

In autonomous driving control, autonomous driving is performed based on real-time information applied to this high-precision map. In the present embodiment, moving states of the same object 24 for recognition before and after the detection time interval indicated from the driving assistance control device 12 side are calculated.

Figure 6A:
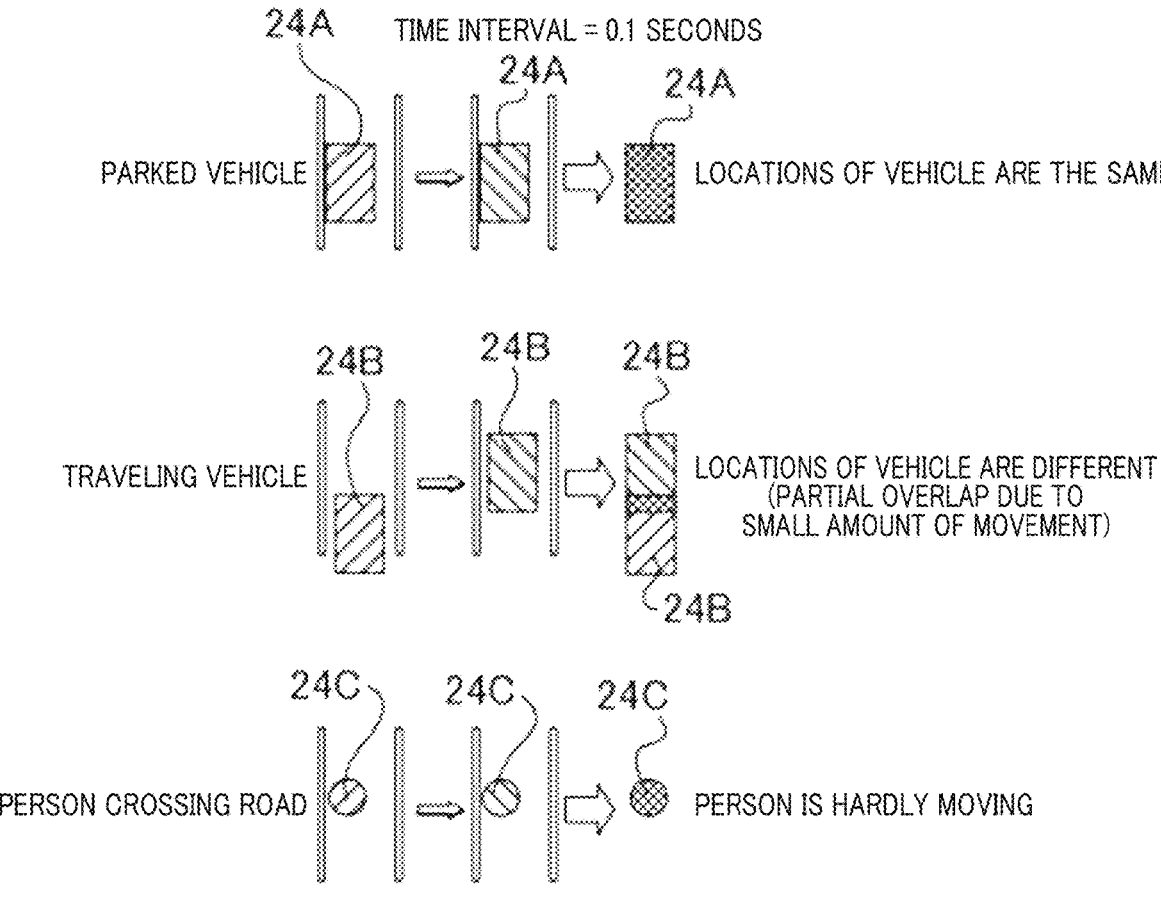
FIG. 6A is a plan view illustrating results of location information depending on the change in time for a parked vehicle, a traveling vehicle, and a person crossing a road, as objects for recognition, in the vicinity of the vehicle during autonomous driving, in the case of the detection time interval of 0.1 seconds.
Figure 6A:
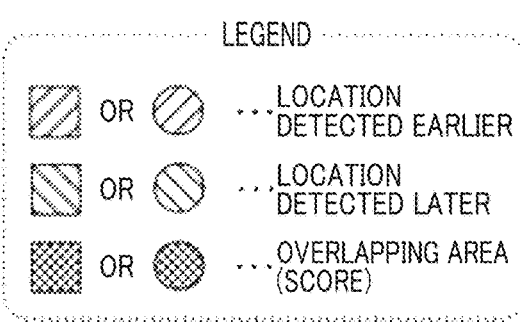
Figure 6B:
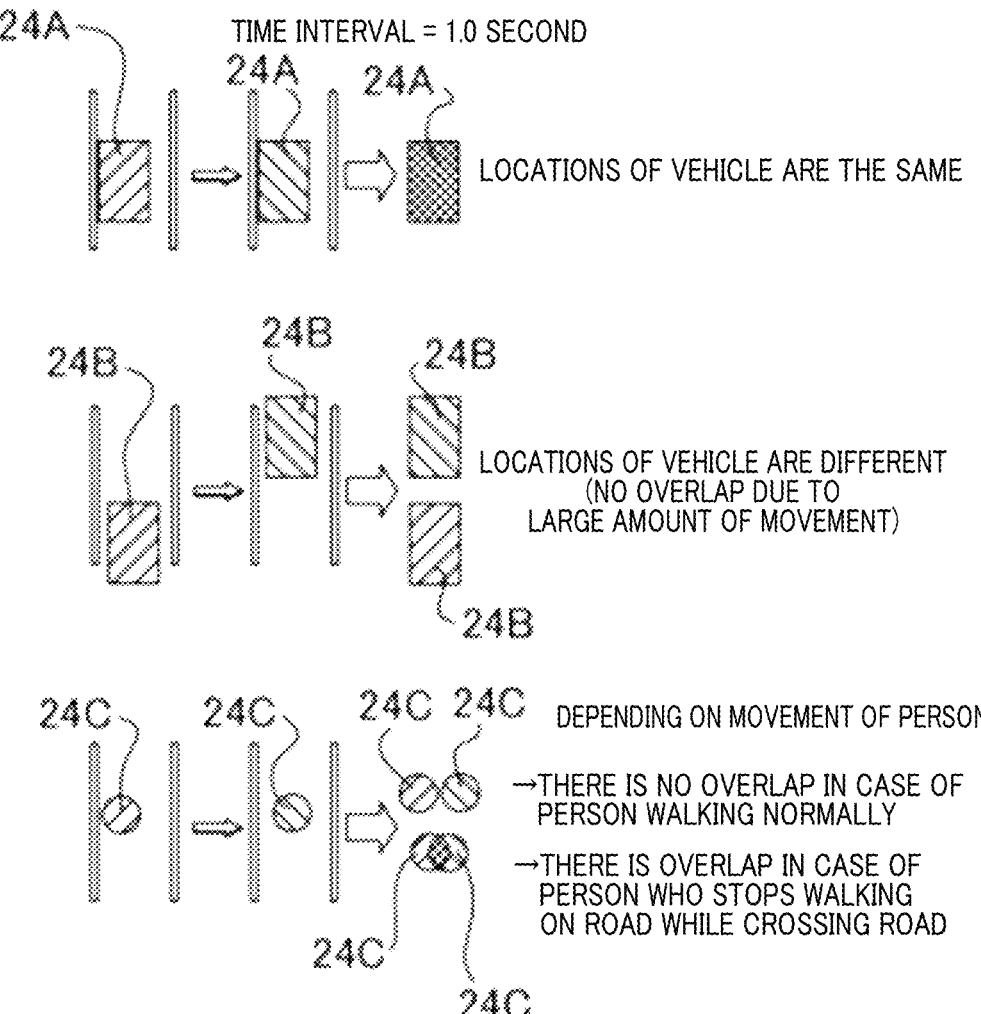
FIG. 6B is a plan view illustrating results of location information depending on the change in time for a parked vehicle, a traveling vehicle, and a person crossing a road, as objects for recognition, in the vicinity of the vehicle during autonomous driving, in the case of the detection time interval of 1.0 second.
Figure 6B:
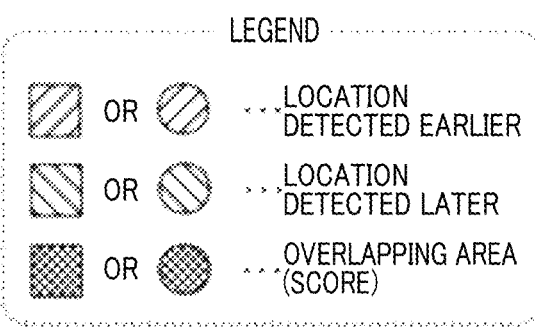

In FIGS. 6A and 6B, location information depending on the change in time is acquired for a parked vehicle 24A, a traveling vehicle 24B, and a person 24C crossing a road as objects 24 for recognition in the vicinity of the vehicle 10 during autonomous driving.

In FIG. 6A, the detection time interval is 0.1 seconds. Since the parked vehicle 24A is stationary, it remains at the same location even after 0.1 seconds. Therefore, the area of overlap between the occupied areas of the parked vehicle 24A before and after the detection time interval is equal to the occupied area of the parked vehicle 24A (in terms of ratio, 100% occupancy).

In FIG. 6A, since the traveling vehicle 24B is in motion, the locations of the traveling vehicle 24B before and after 0.1 seconds are different. The area of overlap between the occupied areas of the traveling vehicle 24B before and after the detection time interval is smaller than the occupied area of the traveling vehicle 24B (in terms of ratio, for example, 10% occupancy although it depends on the vehicle speed).

That is, the occupied areas of the traveling vehicle 24B before and after the detection time interval partially overlap due to the small amount of movement of the traveling vehicle 24B.

In FIG. 6A, even if the person 24C who is crossing the road is in motion, taking into account his/her walking speed (about 4 km/hour), the person 24C will remain at almost the same location even after 0.1 seconds. Therefore, the area of overlap between the occupied areas of the person 24C before and after the detection time interval is almost equal to the occupied area of the person 24C (in terms of ratio, 100% occupancy).

That is, setting of the detection time interval=0.1 seconds is assumed when one wishes see conditions in the vicinity of the vehicle 10 on the road during autonomous driving (see FIG. 1), and information about the object for recognition having a larger area of overlap will be preferentially transmitted to the driving assistance control device 12. More specifically, the parked vehicle 24A is given priority over the traveling vehicle 24B and the person 24C.

In FIG. 6B, the detection time interval is 1.0 second. Since the parked vehicle 24A is stationary, it remains at the same location even after 1.0 second. Therefore, the area of overlap between the occupied areas of the parked vehicle 24A before and after the detection time interval is equal to the occupied area of the parked vehicle 24A (in terms of ratio, 100% occupancy).

In FIG. 6B, since the traveling vehicle 24B is in motion, the occupied areas of the traveling vehicle 24B before and after the detection time interval will not overlap (in terms of ratio, 0% occupancy at a typical vehicle speed (30-40 km/h)). That is, the occupied areas of the traveling vehicle 24B before and after the detection time interval do not overlap due to a large amount of movement of the traveling vehicle 24B.

In FIG. 6B, even if the person 24C who is crossing the road is in motion, taking into account his/her walking speed (about 4 km/hour), the amount of movement is such that the occupied areas of the person 24C before and after the detection time interval overlap at most partially (in terms of ratio, 30% occupancy). In the case of the person 24C who is crossing the road, although depending on the movement of the person, the occupied areas of the person 24C walking normally before and after the detection time interval do not overlap. In the event where a person stops on the road while crossing the road, the occupied areas of such a person before and after the detection time interval overlap.

That is, setting of the detection time interval=1.0 second is assumed when one wishes to collect information about obstacles, particularly, information about obstacles that are stationary, in the vicinity of the vehicle 10 on the road during autonomous driving (see FIG. 1). Information about the object having a larger area of overlap will be preferentially transmitted to the driving assistance control device 12. More specifically, the parked vehicle 24A is an object to be selected, but the traveling vehicle 24B is not an object to be selected.

Since the area is a scalar quantity, even if the occupancy of the person 24C is 100%, the priority of the person 24C is low because the area of the person itself is small. In an alternative embodiment, only the discrimination between the parked vehicle 24A and the traveling vehicle 24B may be made because the discrimination between the person 24C, the parked vehicle 24A and the traveling vehicle 24B may have been made reliably in other controls of the autonomous driving control device 20, and the person 24C may be excluded from objects to be selected, or if there is a (non-zero) overlapping area of the person 24C, its information may be transmitted with a lower priority.

In the present embodiment, the images (of surroundings of the autonomous driving vehicle during autonomous driving) based on which scores are calculated are captured by the group of cameras 16 mounted to the vehicle 10. In an alternative embodiment, the images of various objects 24 for recognition in the vicinity of the autonomous driving vehicle during autonomous driving, based on which occupied areas of overlap (scores) are calculated, may be captured by infrastructure cameras, including monitoring cameras installed along roads to monitor traffic conditions and various monitoring cameras installed in towns and stores for security purposes.

Although it has been described in the aforementioned embodiments that the programs are pre-stored (installed) in the non-volatile memory, the present invention is not limited thereto. The programs are stored in the non-transitory tangible storage medium, and a method corresponding to each of the programs is implemented by execution of the program. The programs may be provided in a form recorded on a non-transitory tangible storage medium, such as a compact disk read only memory (CD-ROM), a digital versatile disk read only memory (DVD-ROM), a universal serial bus (USB) memory, a semiconductor memory and the like. Each of the programs may be downloaded from an external device via a network.

Although the present disclosure has been described in accordance with the above-described embodiments, it is not limited to such embodiments, but also encompasses various variations and variations within equal scope. In addition, various combinations and forms, as well as other combinations and forms, including only one element, more or less, thereof, are also within the scope and idea of the present disclosure.

What is claimed is:

1. An information collection control device for a vehicle capable of autonomous driving, configured to collect information about objects for recognition located in a vicinity of the vehicle when the vehicle, during autonomous driving, receives driving assistance from a driving assistance control device, the information collection control device comprising:

an identification unit configured to analyze detection information detected by a sensor that monitors surroundings of the vehicle to identify a plurality of types of objects for recognition located in the vicinity of the vehicle;

an acquisition unit configured to acquire, for each object for recognition identified by the identification unit, a location and an occupied area of the respective object for recognition on a map corresponding to the vicinity of the vehicle;

a time-interval setting unit configured to set a time interval for the acquisition unit acquiring the location and the occupied area of the object for recognition;

a score calculation unit configured to calculate a size of an area of overlap between the occupied areas of the object for recognition acquired before and after the time interval set by the time-interval setting unit; and a priority determination unit configured to determine a priority that defines a frequency of transmission to the driving assistance control device based on the size of the area of overlap of the object for recognition calculated by the score calculation unit, wherein

12 information about the object for recognition is transmitted to the driving assistance control device such that the information having a higher priority is transmitted at a higher frequency than the information having a lower priority, and the driving assistance control device performs driving control of the vehicle based on the acquired driving assistance information.

2. The information collection control device according to claim 1, wherein the size of the area of overlap is an area on the map, and the area on the map is used as a score to quantify and compare degrees of importance of monitoring the objects for recognition.

3. The information collection control device according to claim 2, wherein the priority determination unit is configured to determine a priority of information about the object for recognition such that the information about the object for recognition is prioritized according to increasing magnitude of scalar quantity of the score.

4. The information collection control device according to claim 2, wherein the priority determination unit is configured to determine whether a scalar quantity of the score of the object for recognition is zero, and in response to determining that the scalar quantity of the score of the object for recognition is zero, exclude the object for recognition from transmission of information about the object for recognition.

5. The information collection control device according to claim 1, wherein the time interval set by the time-interval setting unit is selected from at least two different time intervals for distinguishing between an object for recognition that is in motion and an object for recognition that is stationary.

6. The information collection control device according to claim 1, wherein the time interval set by the time-interval setting unit is set to either of a time interval for monitoring other vehicles in motion and a time interval for monitoring obstacles on a road.

7. The information collection control device according to claim 1, wherein the score calculation unit is configured to calculate, only for each of objects for recognition on a road on which the vehicle can travel during autonomous driving, the size of the area of overlap.

8. The information collection control device according to claim 1, wherein the time-interval setting unit is configured to set the time interval based on response information to the vehicle notifying the driving assistance control device of occurrence of a situation that interferes with autonomous driving.

9. An information collection control method for collecting information about objects for recognition located in a vicinity of a vehicle capable of autonomous driving, when the vehicle, during autonomous driving, receives driving assistance from a driving assistance control device, the information collection control method comprising:

analyzing detection information detected by a sensor that monitors surroundings of the vehicle to identify a plurality of types of objects for recognition located in the vicinity of the vehicle;

acquiring, for each identified object for recognition, a location and an occupied area of the respective object for recognition on a map corresponding to the vicinity of the vehicle;

setting a time interval for acquiring the location and the occupied area of the object for recognition;

calculating a size of an area of overlap between the occupied areas of the object for recognition acquired before and after the set time interval; and determining a priority that defines a frequency of transmission to the driving assistance control device based on the calculated size of the area of overlap of the object for recognition, wherein information about the object for recognition is transmitted to the driving assistance control device such that the information having a higher priority is transmitted at a higher frequency than the information having a lower priority, and the driving assistance control device performs driving control of the vehicle based on the acquired driving assistance information.

10. A non-transitory computer readable medium having stored thereon instructions executable by a computer to cause the computer to perform an information collection control method for collecting information about objects for recognition located in a vicinity of a vehicle capable of autonomous driving, when the vehicle, during autonomous driving, receives driving assistance from a driving assistance control device, the information collection control method comprising:

analyzing detection information detected by a sensor that monitors surroundings of the vehicle to identify a plurality of types of objects for recognition located in the vicinity of the vehicle;

acquiring, for each identified object for recognition, a location and an occupied area of the respective object for recognition on a map corresponding to the vicinity of the vehicle;

setting a time interval for acquiring the location and the occupied area of the object for recognition;

calculating a size of an area of overlap between the occupied areas of the object for recognition acquired before and after the set time interval; and determining a priority that defines a frequency of transmission to the driving assistance control device based on the calculated size of the area of overlap of the object for recognition, wherein information about the object for recognition is transmitted to the driving assistance control device such that the information having a higher priority is transmitted at a higher frequency than the information having a lower priority, and the driving assistance control device performs driving control of the vehicle based on the acquired driving assistance information.

* * * * *